UNITED STATES PATENT OFFICE.

LEE KERN FORSYTHE, OF BATTLE CREEK, MICHIGAN, ASSIGNOR OF ONE-HALF TO WILLIAM L. DAVIES, OF DETROIT, MICHIGAN.

PROCESS OF PULVERIZING STONE.

No. 878,515.     Specification of Letters Patent.     Patented Feb. 11, 1908.

Application filed May 11, 1907. Serial No. 373,151.

*To all whom it may concern:*

Be it known that I, LEE KERN FORSYTHE, a citizen of the United States, residing at Battle Creek, in the county of Calhoun and State of Michigan, have invented a new and useful Process of Pulverizing Stone, of which the following is a specification.

My invention relates to the preliminary steps in the making of Portland and natural cements, and has for its object the reduction of the cost of reducing limestone and other rocks to powder, before mixing with the aluminium and silica bearing materials, or for any other purpose.

My invention consists in heating limestone and other carbonates to a temperature which is just below that at which the $CO_2$ is driven off, then treating the heated rock with water, and then grinding or otherwise reducing the same to powder.

Ordinarily, the limestone used in the manufacture of cement is first crushed and then ground to the desired fineness. I have discovered that by heating the rock to about 400 degrees Fahrenheit, and then plunging the same into water, or by throwing water on the same, the limestone is rendered very friable, so that it can easily be crushed and ground, the output of the mills being greatly increased. At the same time, the carbonic-acid-gas is not driven off and the material remains carbonate of lime as before and is not reduced to the oxid.

While 400 degrees is suitable for much of the rock which I have tested, it may be necessary to use a lower temperature for some rocks, and it may be advisable to increase the temperature for others, the highest possible temperature for the particular stone to be crushed being desirable, as the stone becomes more friable with increased heat. Care must however be exercised so as to keep the temperature below the point at which the carbonic-acid-gas will pass off. The carbonate of lime is of greater value in the making of cement than oxid, so it is of the utmost importance that the stone be not heated to a point at which the carbonate will be reduced.

Having now explained my improved process, what I claim as my invention and desire to secure by Letters Patent is,—

1. A process for preparing natural carbonate of lime in the form of stone for grinding which consists in heating the same to a temperature just below that at which carbonic-acid-gas is driven off, and treating the heated stone with water.

2. The process of preparing powdered natural carbonates in the form of stone, which consists in heating the stone to as high a temperature as is possible without driving off the carbonic-acid-gas, bringing the heated stone into contact with water, then crushing and grinding the same.

3. A process for preparing natural carbonates in the form of stone for grinding, which consists in heating the same to a high temperature without driving off the carbonic-acid-gas, and then treating the stone with water.

In testimony whereof I have signed this specification in the presence of two subscribing witnesses.

LEE KERN FORSYTHE.

In the presence of—
    EDWARD N. PAGELSEN,
    ELIZABETH M. BROWN.